United States Patent [19]

Sonneborn

[11] Patent Number: 4,493,386
[45] Date of Patent: Jan. 15, 1985

[54] SINGLE CYLINDER TILT-CAB ANTI-TORSION APPARATUS

[75] Inventor: Lambertus J. Sonneborn, Oldenzaal, Netherlands

[73] Assignee: Applied Power Inc., Milwaukee, Wis.

[21] Appl. No.: 472,494

[22] Filed: Mar. 7, 1983

[51] Int. Cl.³ .............................................. B62D 33/06
[52] U.S. Cl. ................................................. 180/89.15
[58] Field of Search ............... 180/89.14, 89.15, 89.16; 296/190

[56] References Cited

U.S. PATENT DOCUMENTS 3,831,999 8/1974 Sonneborn ...................... 180/89.15
4,253,700 3/1981 Di Francescantonio ........ 180/89.14

FOREIGN PATENT DOCUMENTS 2419753 10/1975 Fed. Rep. of Germany ...... 296/190

Primary Examiner—Joseph F. Peters, Jr.
Assistant Examiner—Ross Weaver
Attorney, Agent, or Firm—John J. Byrne; Bradford E. Kile; Kevin M. O'Brien

[57] ABSTRACT

A single cylinder, tilt-cab tractor including a chassis, a cab pivotably mounted about an axis near the front of the chassis, a suspension assembly mounted at each of the forward corners of the cab and a single hydraulic cab tilting cylinder wherein the improvement comprises an auxiliary cylinder mounted between the cab and chassis opposite to the single cab tilting cylinder and hydraulic means to extend the auxiliary cylinder upon pressurization of the cab tilting cylinder to extend the suspension assembly opposite to the single hydraulic cab tilting cylinder prior to tilting of the cab.

7 Claims, 7 Drawing Figures

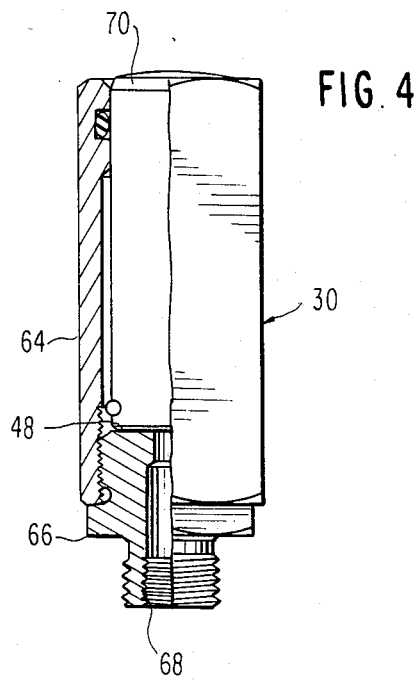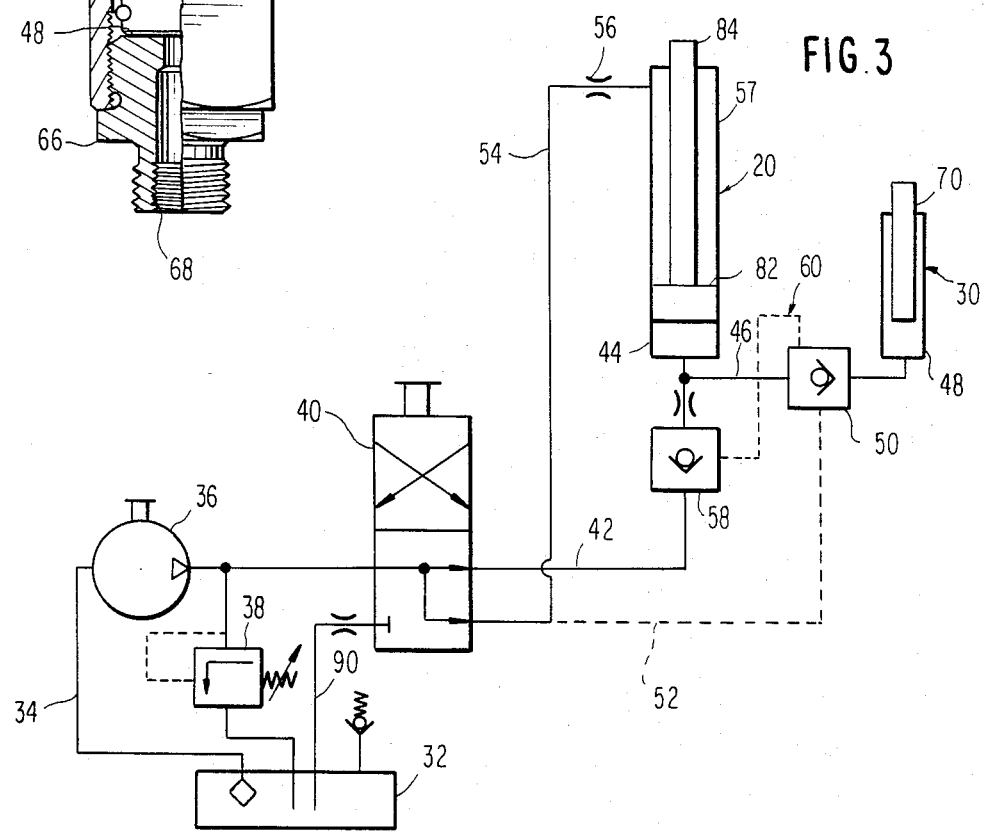

SINGLE CYLINDER TILT-CAB ANTI-TORSION APPARATUS

DESCRIPTION

Technical Field

This invention relates to a hydraulic cylinder and anti-torsion apparatus for a tiltable, over-the-engine, tractor cab.

In the trucking industry the tractor portion of a tractor/trailer combination is often designed with the cab mounted on top of the tractor engine and transmission. Such design, among other things, minimizes the overall length of the rig and is in widespread and popular use.

In order to service and/or repair an engine of the tractor the cab is tilted upward and forward to expose the engine and drive train. An illustration of such a unit may be had by reference to U.S. Pat. No. 3,761,123 to Neill et al., of common assignment with the subject application. In The Neill et al. patented design a hydraulic cylinder is utilized to tilt the cab from a normal, horizontal position to a tilted position as depicted in FIG. 1 of the patent.

In order to cushion and suspend the cab with respect to the tractor chassis during normal over-the-road operation, each corner of the cab is preferably supported by a hydraulic cylinder and accumulator combination which is known as a fully suspended cab. In a fully suspended cab a problem can often exist when the cab is tilted forward or pulled back into position with respect to the tractor chassis and engine. In this connection, when one hydraulic cylinder—mounted upon either the left or the right side of the engine—is relied upon to provide the tilting action of the cab, interference with peripheral components of the tractor engine can exist. More specifically, if the hydraulic cylinder is mounted upon the left-hand side of the cab the tilt cylinder will try to extend the front left-hand side of the cab suspension cylinder system and, because of torsional effects, at the same time try to collapse the front right-hand suspension cylinder. This results in a condition in which the cab is canted or rolled sideways, prior to any forward tilting action. Such canting, if too severe, can cause damage to various peripheral parts of the tractor engine such as the radiator and the like. In a similar vein, torsional effects may tend to bring the cab structure into interfering contact with the radiator during a tilt-return sequence of the cab.

One technique for minimizing the foregoing torsional action of the cab comprises using two hydraulic tilting cylinders, one on each side of the tractor chassis. Such cylinder arrangements, however, tend to be somewhat expensive, occupy space, block direct access to the engine, and are subject to potential service difficulties.

The difficulties suggested in the preceding paragraph are not intended to be exhaustive, but rather are among many which tend to reduce the effectiveness of prior tractor cab tilting systems. Other noteworthy problems may also exist; however, those presented above should be sufficient to demonstrate that designs appearing in the past will admit to worthwhile improvement. In this connection it would be desirable to provide a tilt-cab tractor with a single cylinder tilting system which would reduce the damaging impact of inherent torsional effects of the cab as it tilts forward and returns with respect to the tractor engine. Additionally it would be desirable to provide such a single cylinder tilt-cab apparatus which would be operational for a fully suspended tractor cab.

OBJECTS OF THE INVENTION

Accordingly, it is a general object of the invention to provide a novel, single cylinder tilt-cab apparatus which will obviate and/or minimize problems of the type previously described.

It is a particular object of the invention to provide a novel single cylinder tilt-cab apparatus which will reduce torsional effects of the cab during a tilting and return sequence.

It is another object of the invention to provide a novel single cylinder tilt-cab wherein torsional tendencies of the cab during a tilting and return operation can be minimized without relying upon dual tilting cylinders symmetrically spaced on either side of the tractor engine.

BRIEF SUMMARY OF THE INVENTION

A single cylinder tilt-cab apparatus according to a preferred embodiment of the invention may be advantageously mounted upon a tractor having a chassis or frame, a cab mounted on the chassis and pivotable with respect to the chassis about an axis near the front end thereof and a suspension cylinder mounted between the chassis and cab at each of the left and right, front and rear corners of the cab. The subject anti-torsion apparatus includes a single hydraulic tilting cylinder mounted between the tractor chassis and one side portion of the cab. An auxiliary cylinder is mounted upon the other side of the tractor between the chassis and cab and is hydraulically connected to the actuating system for the tilting cylinder such that upon pressure actuation of the tilting cylinder the auxiliary cylinder will fully extend to disengage or lock out the suspension assembly opposite to the hydraulic tilting cylinder prior to tilting of the cab.

BRIEF DESCRIPTION OF THE DRAWINGS

Other objects and advantages of the present invention wikll become apparent from the following detailed description taken in conjunction with the accompanying drawings wherein:

FIG. 3 is a schematic diagram of the hydraulic circuitry of the subject invention;

FIG. 4 is a detailed view, partially broken away to reveal internal detail of an auxiliary cylinder in accordance with the invention;

DETAILED DESCRIPTION

Figure 1:
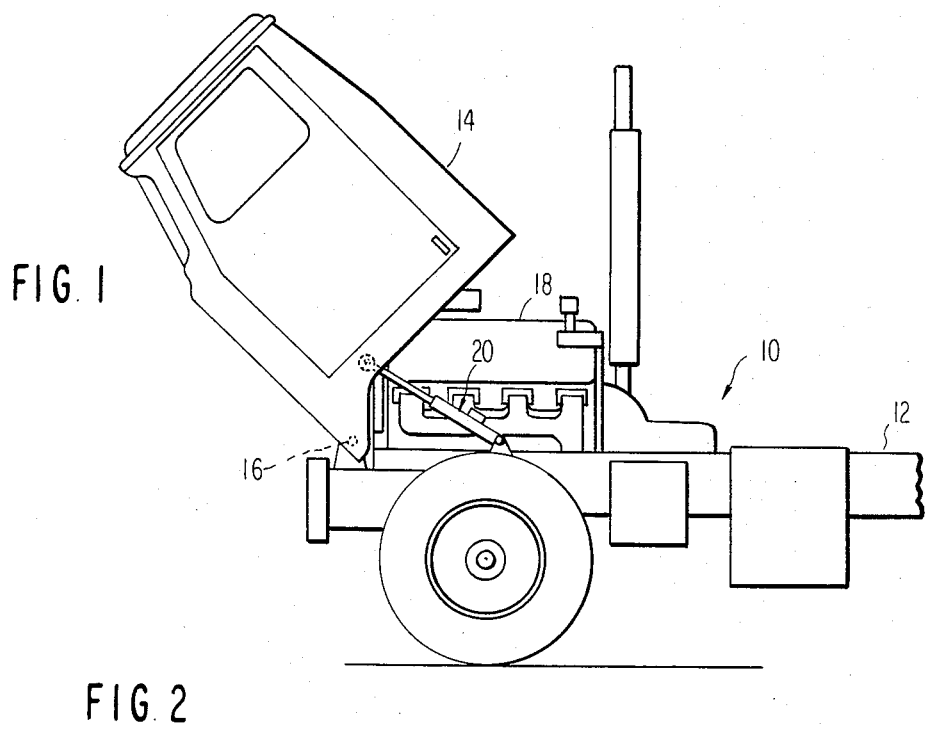
FIG. 1 is a side elevational view of a tractor having a tiltable cab which comprises the operative environment of the subject invention.

Referring now to the drawings wherein like numerals indicate like parts and particularly to FIG. 1 thereof there will be seen a tractor 10 comprising a chassis or frame 12 and a cab 14 pivotable relative to the chassis 12 at a forward pivot axis 16 to expose an engine 18 for maintenance and the like. Tilting motion of the cab 14 relative to the chassis 12 is controlled by a hydraulic cylinder 20 as will be discussed in detail below. Although not illustrated, actuation of the hydraulic cylinder 20 is controlled from a station, typically mounted on the chassis, which is remote from the cab 14 and the hydraulic cylinder 20. Accordingly, an operator is entirely out of the way of the pivoting cab 14 while operating the hydraulic cylinder 20.

Figure 2:
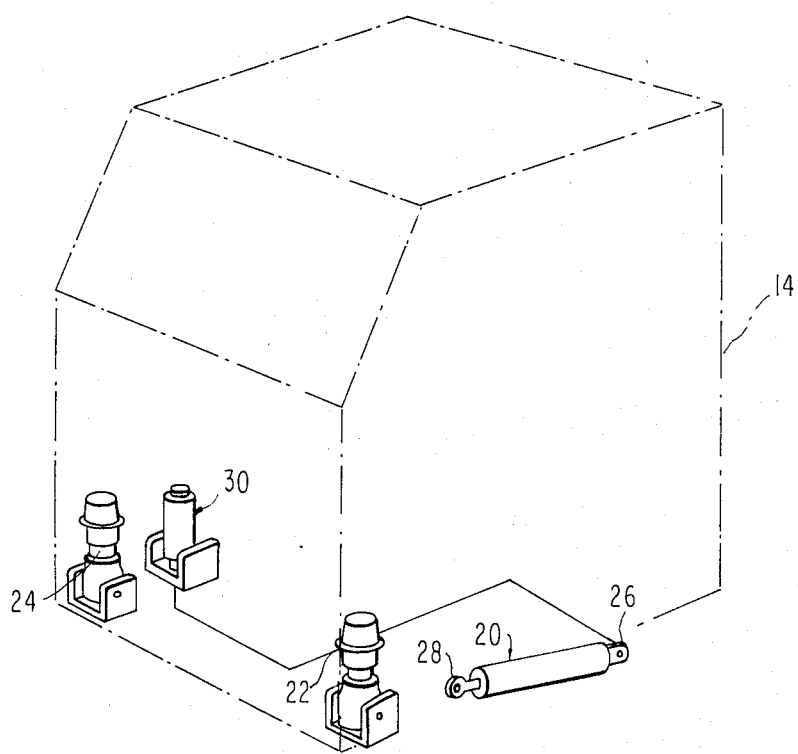
FIG. 2 is a schematic perspective view of the tilt cab depicted in FIG. 1 disclosing the general arrangement of front left and right, suspension assemblies, a single cab tilting cylinder, and a cab auxiliary cylinder in accordance with the subject invention.

Turning to FIG. 2 there will be seen a schematic outline of the pivoting tractor cab 14, in phantom lines, to illustrate the general location of the various principal components of the system of the subject invention. In this connection, a forward left-hand side of the cab is shown suspended with respect to the chassis by a suspension assembly 22 of a type known in the art and is operative to cushion the cab with respect to the chassis during normal over-the-road running operation. The suspension as schematically represented by number 22 preferably comprises a hydraulic cylinder resiliently maintained at a predetermined suspension pressure by an accumulator and hydraulic system. In a similar manner, the forward right-hand side of the cab is supported with respect to the chassis by a spring and suspension structure which is schematically depicted at 24.

The lifting cylinder 20 is pivotally connected to the chassis at one end 26, and in a similar manner, is pivotally mounted to the tiltable cab at 28. A hydraulic auxiliary cylinder 30 is mounted upon an opposite side of the tractor chassis and extends between the chassis and the cab and is selectively operable to extend and lock out the suspension assembly 24 prior to tilting of the cab with respect to the chassis.

Referring now to FIG. 3, there will be seen a hydraulic schematic of the subject invention. A source of hydraulic fluid or sump is schematically shown at 32 and operably supplies hydraulic fluid via line 34 to a hydraulic pump 36. An overpressure relief valve 38 operably serves to vent fluid back to the reservoir 32 as is conventional in such hydraulic circuit systems.

A control valve 40 is positioned downstream of the pump and directs hydraulic fluid to a first conduit 42 for delivering hydraulic fluid to the push side 44 of the tilting cylinder 20. A second conduit 46 extends from conduit 44 and operably delivers hydraulic fluid under pressure to the push side 48 of the auxiliary cylinder 30. A pilot operated check valve 50 is positioned within line 46 and normally blocks flow through the conduit 46 to the auxiliary cylinder 30. However, a pilot pressure line 52 extends from control valve 40 and during a lifting operation of the tilting cylinder 20 operably supplies pilot pressure to valve 50 to open the valve.

A third conduit 54 is fluidically connected to a control valve 40 and delivers hydraulic fluid through a restrictor 56 into the pull side 57 of the tilting cylinder 20.

A pilot operated check valve 58 is positioned within line 42 and is directed to pass pressurized fluid from line 42 to the push side of cylinder 20, but block return flow from the push side of the cylinder. During the application of hydraulic pressure to the pull side of cylinder 20, an extension 60 of pilot line 52 operably opens valve 58 for venting of hydraulic fluid from the push side of the tilt cylinder during a return cycle of the cab with respect to the tractor chassis.

Turning to FIG. 4, there will be seen a more detailed view of the previously discussed auxiliary cylinder 30. The auxiliary cylinder 30 includes a cylindrical housing 64 which is closed at one end by plug 66 having a coaxial bore 68 operable to be connected to line 46. Internally the housing 64 carries a solid cylindrical piston 70 which operably extends and retracts within the housing 64 in response to pressurization of the push side 48 of the cylinder.

Figure 5:
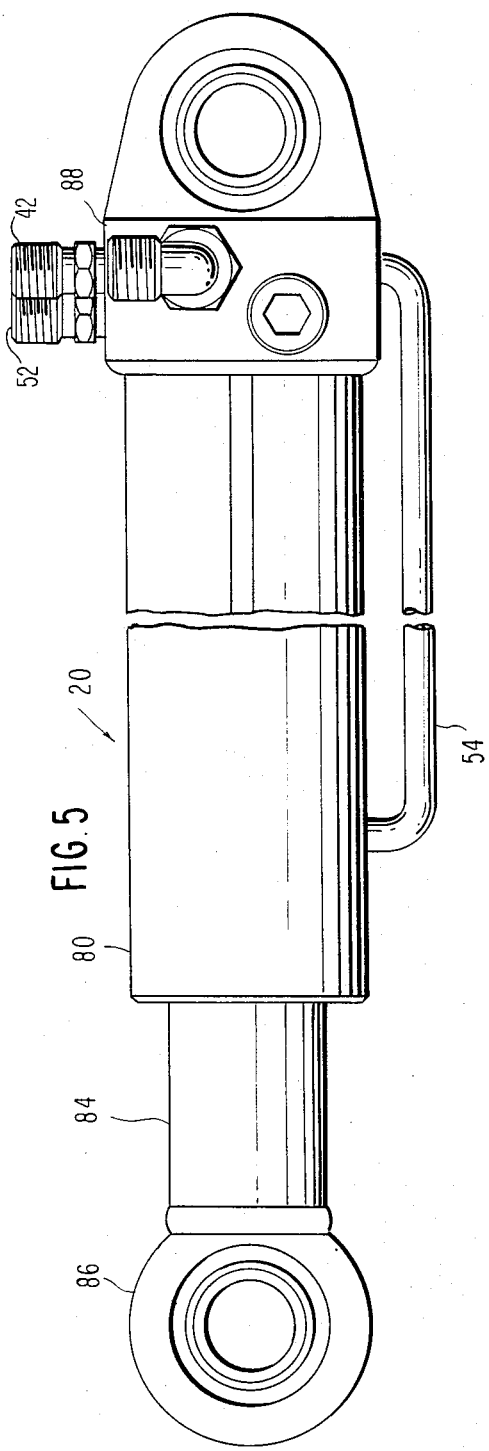
FIG. 5 is a side elevational view of a hydraulic tilt-cab cylinder for raising and lowering the cab with respect to the tractor chassis.
Figure 6:
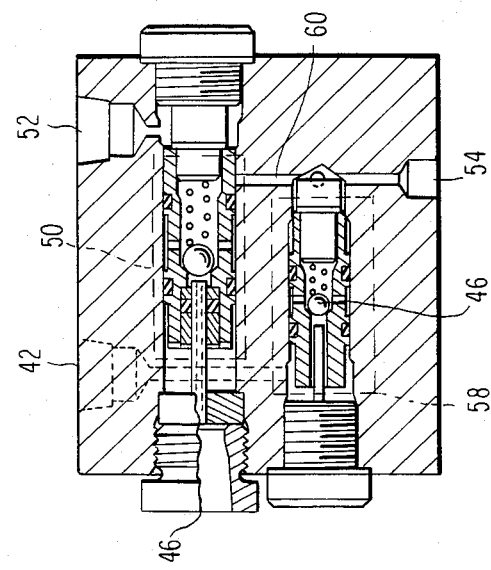
FIG. 6 is a cross-sectional detail view of a valving arrangement of the subject invention hydraulic circuitry within the base of the tilt-cab cylinder.
Figure 7:
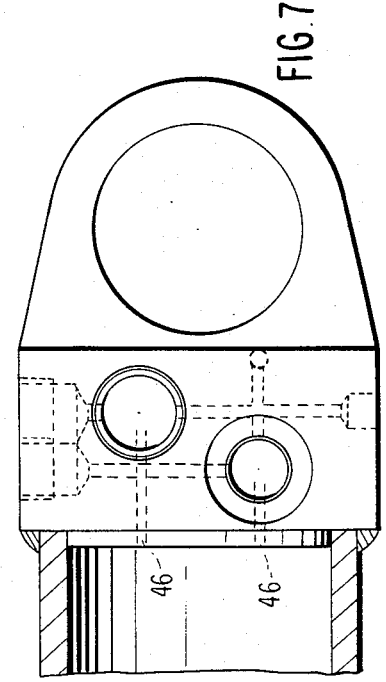
FIG. 7 is a top view of the base of the tilt-cab cylinder disclosing various port positions for the hydraulic system of the subject invention.

FIGS. 5 through 7 disclose various detailed views of a conventional hydraulic tilting cylinder 20. The tilting cylinder includes an exterior cylindrical housing 80 which surrounds a piston head 82, note FIG. 3, and a piston arm 84 which operably extends through conventional seals and is integrally joined with a pivotal mounting 86 for releasable attachment to the cab 14 (note FIGS. 1 and 2).

The base 88 of the hydraulic cylinder 20 contains the valving and hydraulic circuitry schematically depicted in FIG. 3. More specifically and with reference to FIG. 6 the first pilot operated check valve 50 is shown within a phantom line box on an upper portion of FIG. 6 and the second pilot operated check valve 58 is shown within a phantom line box located on the lower portion of FIG. 6. Those valves are of conventional design and operate or are selectively opened by the applciation of pilot pressure as previously discussed. The various ports and passages depicted in the schematic of FIG. 3 are shown as they operably extend through the base 88 of the hydraulic lifting cylinder.

OPERATING SEQUENCE

The above-described tilt cab hydraulic system operably draws hydraulic fluid from the reservoir 32 through control valve 40 and delivers pressurized fluid through line 42 and into the push side 40 of the lifting cylinder 20. Simultaneously pilot valve pressure is delivered through line 52 to pilot valve 50 which opens and permits hydraulic pressure from line 42 to enter the push end of auxiliary cylinder 70. (It will be noted that as the pilot operated check valve 50 is opened pilot pressure can continue through line 60 to also open the pilot operated check valve 58. However, pilot operated check valve 58 has already been pumped open by the pressurized line 42. Accordingly, pilot pressure does not effect a change in valve 58 during the lifting or forward-tilting state of operation.)

The rod or plunger 70 within auxiliary cylinder 30 will extend at a relatively low pressure, thereby raising the front right-hand side of the cab. If the plunger 70 is fully extended, pressure will raise in line 42 and 54 to start tilting the cab 14 forward. The lifting force from the tilting cylinder, however, gives a torsional effect to the front left-hand side of the suspension. Thus, prior to tilting forward the front-left suspension extends thereby bringing the cab into a horizontal posture relative to the chassis or frame. The cab then starts to tilt forward.

During the tilt cycle the tilt pressure drops as the center of gravity of the cab comes over the cab pivot point and, consequently, so does the torsional effect of the tilt cylinder on the front suspension. Also, the force (cab weight) on the auxiliary cylinder increases and during this portion of the cycle the front suspension elements will close.

When returning the cab to the normal running position, the control valve 40 is shifted downwardly from the posture depicted in FIG. 3 and pressurized fluid flows through line 54 to the pull or front side of the tilt cylinder. In addition, pilot pressure is delivered via line 52 to the check valve 50 thus opening valve 50. In addition pilot pressure flows through line 60 to the pilot operated check valve 58 to open valve 58. Hydraulic fluid behind the push end of cylinder 20 is then permitted to vent, via line 40, back to the reservoir 32 through conduit 90.

In describing the invention reference has been made to a preferred embodiment. Those skilled in the art will recognize several advantages which are expressly or inherently disclosed by this embodiment of the invention.

Without attempting to detail all of the advantages of the invention, a particularly significant aspect is the provision of an auxiliary cylinder which is hydraulically coupled to a single tilt-cab cylinder to operably offset and/or minimize the disadvantages of torsional effects imparted to a fully suspended system during a tilting operation of the tractor cab.

In describing the invention reference has been made to a preferred embodiment. Those skilled in the art, however, and familiar with the disclosure of the subject invention, may recognize additions, deletions, modifications, substitutions, and/or other changes which will fall within the purview of the invention as defined in the following claims.

I claim:

1. In a single cylinder tilt-cab tractor comprising
   (a) a chassis;
   (b) a cab mounted on said chassis and pivotable with respect to said chassis about an axis near a front end of said chassis;
   (c) a suspension assembly mounted between said chassis and cab at each of a left- and right-forward corner of said cab; and
   (d) a single hydraulic cab tilting cylinder pivotably mounted between said chassis and said cab on one of the right side or the left side of the cab and being operable to selectively tilt said cab between a normal running position and a raised service position, wherein the improvement comprises:
   an auxiliary cylinder mounted upon one of said cab and said chassis and extending toward the other of said cab and said chassis opposite from the location of said single hydraulic cab tilting cylinder; and
   hydraulic means operable to extend said auxiliary cylinder into engagement with the other of said cab and said chassis prior to hydraulic actuation of said single hydraulic cab tilting cylinder to prevent said cab tilting cylinder from torsionally rolling the cab sideways into interfering contact with peripheral elements of the tractor engine during a cab raising or lowering operation.

2. In a single cylinder tilt-cab tractor as defined in claim 1 wherein said hydraulic means comprises:
   means for supplying hydraulic fluid under pressure;
   control valve means downstream of said means for supplying hydraulic fluid under pressure;
   first means for delivering hydraulic fluid under pressure to the push side of said single hydraulic cab tilting cylinder for tilting said cab forward with respect to said chassis; and
   second means for delivering hydraulic fluid under pressure to said auxiliary cylinder to extend said auxiliary cylinder when hydraulic fluid under pressure is delivered to the push side of said single hydraulic cab tilting cylinder.

3. In a single cylinder tilt-cab tractor as defined in claim 2 wherein said second means for delivering hydraulic fluid under pressure to said auxiliary cylinder comprises:
   conduit means extending from said first means for delivering hydraulic fluid under pressure to the push side of said single hydraulic cab tilting cylinder to the push side of said auxiliary cylinder;
   check valve means positioned within said conduit means and normally blocking flow through said conduit means to said auxiliary cylinder; and
   pilot pressure means extending from said control valve for delivering pilot pressure from said means for supplying hydraulic fluid under pressure to said check valve means within said conduit to open said check valve means and permit extension of said auxiliary cylinder prior to operational pressurization of the push side of said single hydraulic cab tilting cylinder.

4. In a single cylinder tilt-cab tractor as defined in claim 2 or 3 and further comprising:
   third means for delivering hydraulic fluid under pressure to the pull side of said single hydraulic cab tilting cylinder for tilting said cab to a return running position with respect to said chassis.

5. In a single cylinder tilt-cab tractor as defined in claim 4 wherein said first means for delivering hydraulic fluid under pressure to the push side of said single hydraulic cab tilting cylinder includes:
   check valve means positioned between said control valve means and the push side of said single hydraulic cab tilting cylinder and normally blocking fluid flow away from the push side of said single hydraulic cab tilting cylinder; and
   pilot pressure means extending between said control valve and said check valve means positioned between said control valve means and the push side of said single hydraulic cab tilting cylinder for opening said check valve when the control valve is positioned to pressurize the pull side of said single hydraulic cab tilting cylinder.

6. In a single cylinder tilt-cab tractor as defined in claim 2 and further comprising:
   third means for delivering hydraulic fluid under pressure to the pull side of said single hydraulic cab tilting cylinder for tilting said cab to a return running position with respect to said chassis;
   said first means for delivering hydraulic fluid under pressure to the push side of said single hydraulic cab tilting cylinder includes,
   first check valve means positioned between said control valve means and the push side of said single hydraulic cab tilting cylinder and normally blocking fluid flow away from the push side of said single hydraulic cab tilting cylinder;
   said second means for delivering hydraulic fluid under pressure to said auxiliary cylinder includes,
   conduit means extending from said first means for delivering hydraulic fluid under pressure to the push side of said single hydraulic cab tilting cylinder to the push side of said auxiliary cylinder;
   second check valve means positioned within said conduit means normally blocking flow through said conduit to said auxiliary cylinder;

first pilot pressure conduit means extending from said control valve for delivering pilot pressure from said means for supplying hydraulic fluid under pressure to said second check valve to open said check valve and permit extension of said auxiliary cylinder prior to operational pressurization of the push side of said single hydraulic cab tilting cylinder; and second pilot pressure conduit means extending from said second check valve means and being fluidially connected to said first pilot pressure conduit and operably opening said first check valve when the control valve is positioned to pressurize the pull side of said single hydraulic cab tilting cylinder to vent the push side of said single hydraulic cab tilting cylinder.

7. In a single cylinder tilt-cab tractor as defined in claim 1 wherein:

said single hydraulic cab tilting cylinder is positioned upon the front-left side of the cab; and said auxiliary cylinder is mounted upon the chassis and extends upwardly on the front-right side of the cab.

* * * * *